US012273864B2

(12) United States Patent
Abotabl et al.

(10) Patent No.: US 12,273,864 B2
(45) Date of Patent: Apr. 8, 2025

(54) INDICATING AN AVAILABILITY OF SUB-SLOTS IN A SUB-BAND FULL DUPLEX SLOT

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/821,657

(22) Filed: Aug. 23, 2022

(65) Prior Publication Data

US 2024/0073872 A1 Feb. 29, 2024

(51) Int. Cl.
*H04W 72/04* (2023.01)
*H04L 5/14* (2006.01)
*H04W 72/0446* (2023.01)

(52) U.S. Cl.
CPC ........... *H04W 72/0446* (2013.01); *H04L 5/14* (2013.01)

(58) Field of Classification Search
CPC ................ H04L 5/14; H04W 72/0446; H04W 72/0453; H04W 72/23

USPC .......................................................... 370/329
See application file for complete search history.

(56) References Cited

U.S. PATENT DOCUMENTS

| | | | | |
|---|---|---|---|---|
| 2023/0354125 | A1* | 11/2023 | He | H04W 36/06 |
| 2023/0354225 | A1* | 11/2023 | Kwak | H04W 24/08 |
| 2023/0363004 | A1* | 11/2023 | Islam | H04W 74/004 |
| 2024/0179693 | A1* | 5/2024 | Mu | H04W 72/0453 |
| 2024/0224322 | A1* | 7/2024 | He | H04W 72/23 |
| 2024/0243895 | A1* | 7/2024 | Rastegardoost | H04W 72/51 |
| 2024/0334412 | A1* | 10/2024 | Shi | H04W 72/23 |
| 2024/0365355 | A1* | 10/2024 | Mu | H04L 5/001 |

* cited by examiner

*Primary Examiner* — Robert J Lopata
(74) *Attorney, Agent, or Firm* — Mahmoud M. Tomeh; Harrity & Harrity, LLP

(57) ABSTRACT

Various aspects of the present disclosure generally relate to wireless communication. In some aspects, a user equipment (UE) may receive, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot. The UE may perform, with the network node, a communication based at least in part on the eRedCap downlink and uplink BWP configuration. Numerous other aspects are described.

30 Claims, 15 Drawing Sheets

INDICATING AN AVAILABILITY OF SUB-SLOTS IN A SUB-BAND FULL DUPLEX SLOT

FIELD OF THE DISCLOSURE

Aspects of the present disclosure generally relate to wireless communication and to techniques and apparatuses for indicating an availability of sub-slots in a sub-band full duplex (SBFD) slot.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and perform, with the network node, a communication based at least in part on the eRedCap downlink and uplink BWP configuration.

In some implementations, an apparatus for wireless communication at a network node includes a memory and one or more processors, coupled to the memory, configured to: transmit, to a UE, an eRedCap downlink and uplink BWP configuration associated with an SBFD slot, wherein the eRedCap downlink and uplink BWP configuration includes a bit indicating an availability of a sub-band in the SBFD slot; and perform, with the UE, a communication based at least in part on the eRedCap downlink and uplink BWP configuration.

In some implementations, a method of wireless communication performed by a UE includes receiving, from a network node, an eRedCap downlink and uplink BWP configuration associated with an SBFD slot, wherein the eRedCap downlink and uplink BWP configuration includes a bit indicating an availability of a sub-band in the SBFD slot; and performing, with the network node, a communication based at least in part on the eRedCap downlink and uplink BWP configuration.

In some implementations, a method of wireless communication performed by a network node includes transmitting, to a UE, an eRedCap downlink and uplink BWP configuration associated with an SBFD slot, wherein the eRedCap downlink and uplink BWP configuration includes a bit indicating an availability of a sub-band in the SBFD slot; and performing, with the UE, a communication based at least in part on the eRedCap downlink and uplink BWP configuration.

In some implementations, a non-transitory computer-readable medium storing a set of instructions for wireless communication includes one or more instructions that, when executed by one or more processors of a UE, cause the UE to: receive, from a network node, an eRedCap downlink and uplink BWP configuration associated with an SBFD slot, wherein the eRedCap downlink and uplink BWP configuration includes a bit indicating an availability of a sub-band in the SBFD slot; and perform, with the network node, a communication based at least in part on the eRedCap downlink and uplink BWP configuration.

In some implementations, a non-transitory computer-readable medium storing a set of instructions for wireless communication includes one or more instructions that, when executed by one or more processors of a network node, cause the network node to: transmit, to a UE, an eRedCap downlink and uplink BWP configuration associated with an SBFD slot, wherein the eRedCap downlink and uplink BWP configuration includes a bit indicating an availability of a sub-band in the SBFD slot; and perform, with the UE, a communication based at least in part on the eRedCap downlink and uplink BWP configuration.

In some implementations, an apparatus for wireless communication includes means for receiving, from a network node, an eRedCap downlink and uplink BWP configuration associated with an SBFD slot, wherein the eRedCap downlink and uplink BWP configuration includes a bit indicating an availability of a sub-band in the SBFD slot; and means for performing, with the network node, a communication based at least in part on the eRedCap downlink and uplink BWP configuration.

In some implementations, an apparatus for wireless communication includes means for transmitting, to a UE, an eRedCap downlink and uplink BWP configuration associated with an SBFD slot, wherein the eRedCap downlink and uplink BWP configuration includes a bit indicating an availability of a sub-band in the SBFD slot; and means for performing, with the UE, a communication based at least in part on the eRedCap downlink and uplink BWP configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
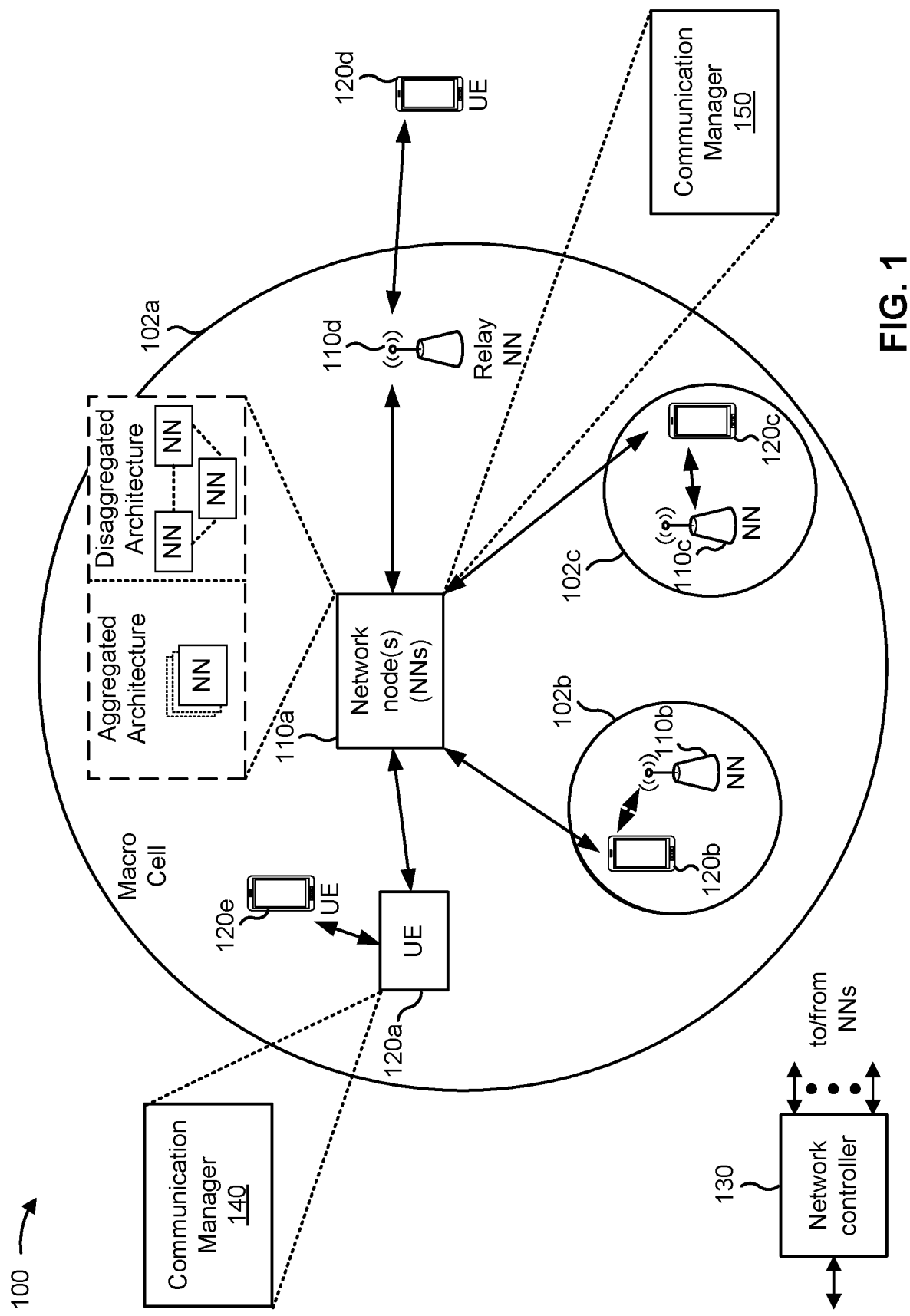
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and perform, with the network node, a communication based at least in part on the eRedCap downlink and uplink BWP configuration. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an eRedCap downlink and uplink BWP configuration associated with an SBFD slot, wherein the eRedCap downlink and uplink BWP configuration includes a bit indicating an availability of a sub-band in the SBFD slot; and perform, with the UE, a communication based at least in part on the eRedCap downlink and uplink BWP configuration. Additionally, or alternatively, the communication manager 150 may perform one or more other operations described herein.

As indicated above, FIG. 1 is provided as an example. Other examples may differ from what is described with regard to FIG. 1.

Figure 2:
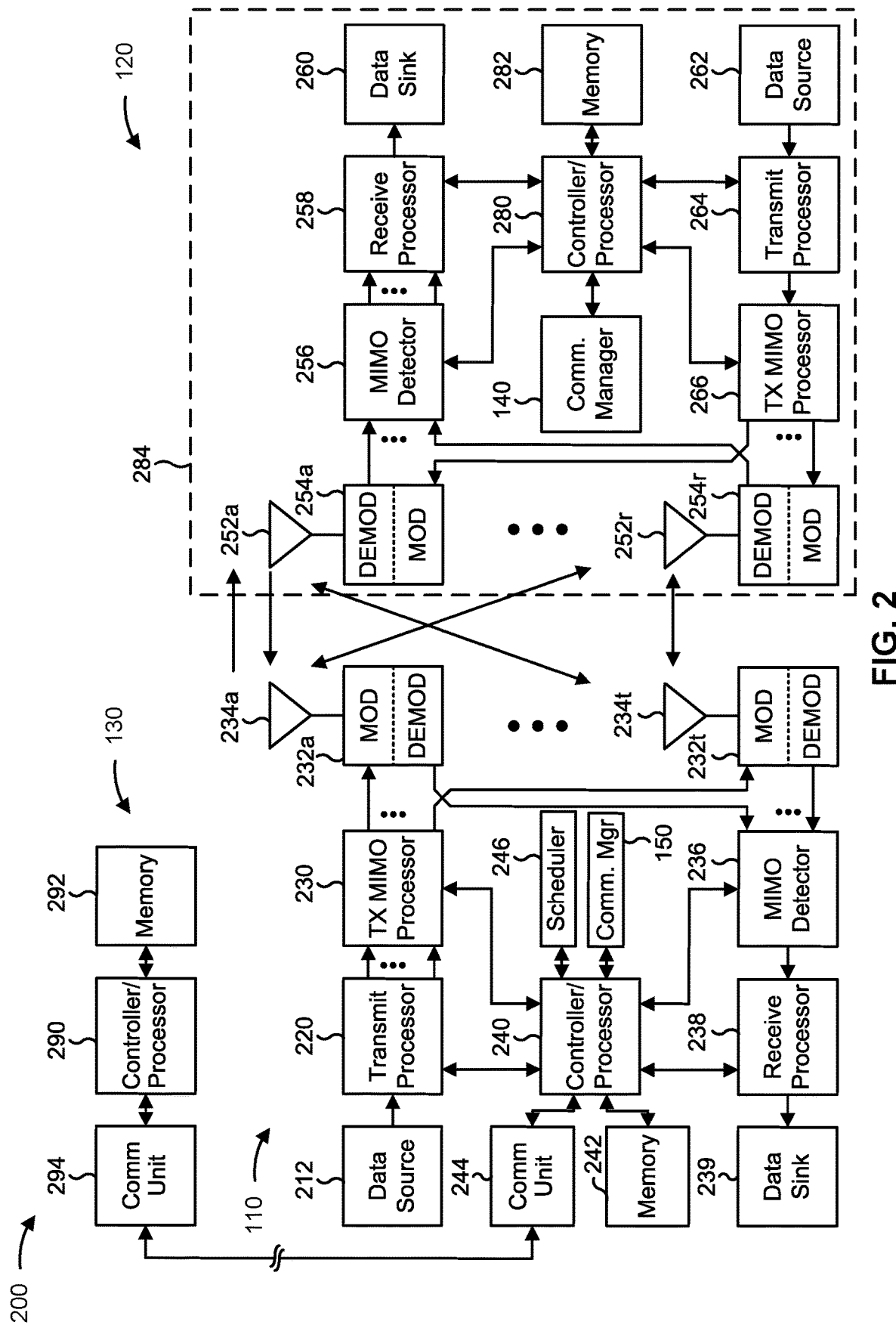
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-15).

The controller/processor 240 of the network node 110, the controller/processor 280 of the UE 120, and/or any other component(s) of FIG. 2 may perform one or more techniques associated with indicating an availability of sub-slots in an SBFD slot, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, an eRedCap downlink and uplink BWP configuration associated with an SBFD slot, wherein the eRedCap downlink and uplink BWP configuration includes a bit indicating an availability of a sub-band in the SBFD slot (e.g., using antenna 252, modem 254, MIMO detector 256, receive processor 258, controller/processor 280, memory 282, or the like); and/or means for performing, with the network node, a communication based at least in part on the eRedCap downlink and uplink BWP configuration (e.g., e.g., using antenna 252, modem 254, MIMO detector 256, receive processor 258, transmit processor 264, TX MIMO processor 266, controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, an eRedCap downlink and uplink BWP configuration associated with an SBFD slot, wherein the eRedCap downlink and uplink BWP configuration includes a bit indicating an availability of a sub-band in the SBFD slot (using controller/processor 240, transmit processor 220, TX MIMO processor 230, modem 232, antenna 234, memory 242, or the like); and/or means for performing, with the UE, a communication based at least in part on the eRedCap downlink and uplink BWP configuration (using transmit processor 220, TX MIMO processor 230, antenna 234, modem 232, MIMO detector 236, receive processor 238, controller/processor 240, memory 242. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
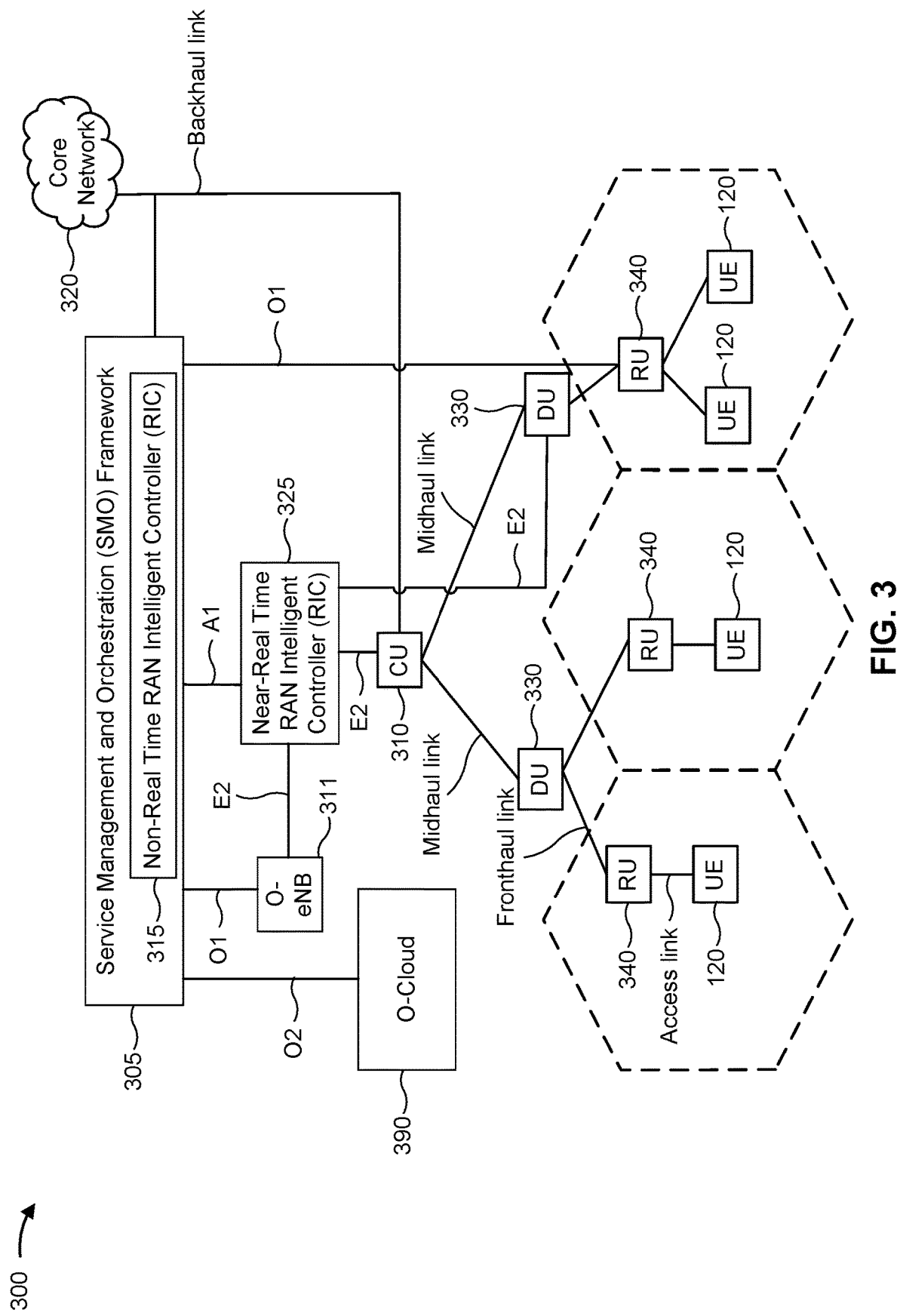
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A full duplex (FD) operation may involve an in-band full duplex (IBFD) operation, in which a transmission and a reception may occur on the same time and frequency resource. A downlink direction and an uplink direction may share the same IBFD time/frequency resource based at least in part on a full or partial overlap. Alternatively, the FD operation may involve an SBFD operation (or flexible duplex), in which a transmission and a reception may occur at the same time but on different frequency resources. A downlink resource may be separated from an uplink resource in a frequency domain. In the SBFD operation, no downlink and uplink overlap in frequency may occur.

Figure 4:
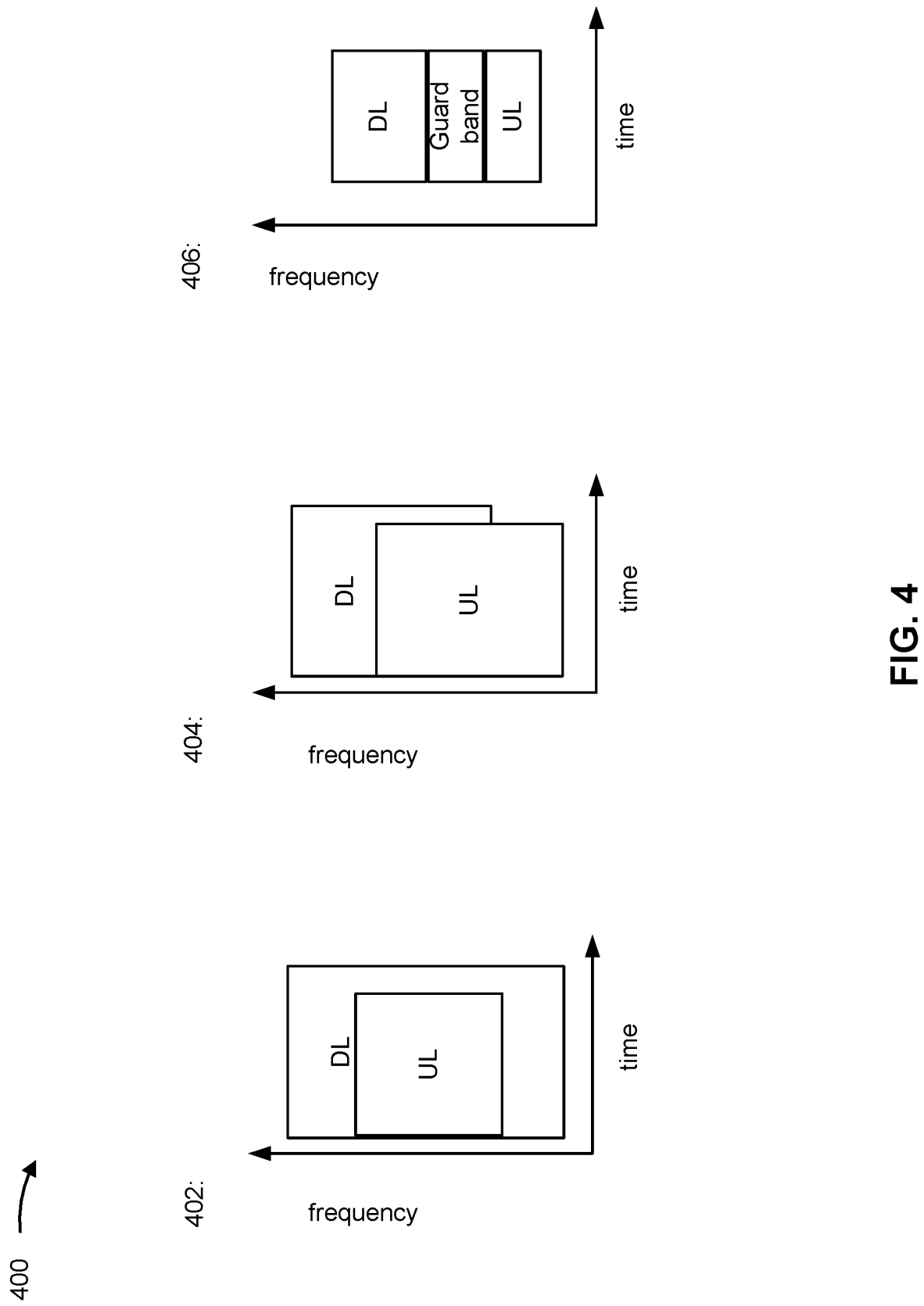
FIG. 4 is a diagram illustrating examples of full duplex (FD) communications, in accordance with the present disclosure.

FIG. 4 is a diagram illustrating examples 400 of FD communications, in accordance with the present disclosure.

As shown by reference number 402, a downlink resource and an uplink resource may share the same IBFD time/frequency resource based at least in part on a full overlap. As shown by reference number 404, a downlink resource and an uplink resource may share the same IBFD time/frequency resource based at least in part on a partial overlap. As shown by reference number 406, a downlink resource and an uplink resource may be associated with a same time but different frequencies. The downlink resource and the uplink resource may be separated by a guard band.

As indicated above, FIG. 4 is provided as an example. Other examples may differ from what is described with regard to FIG. 4.

Figure 5:
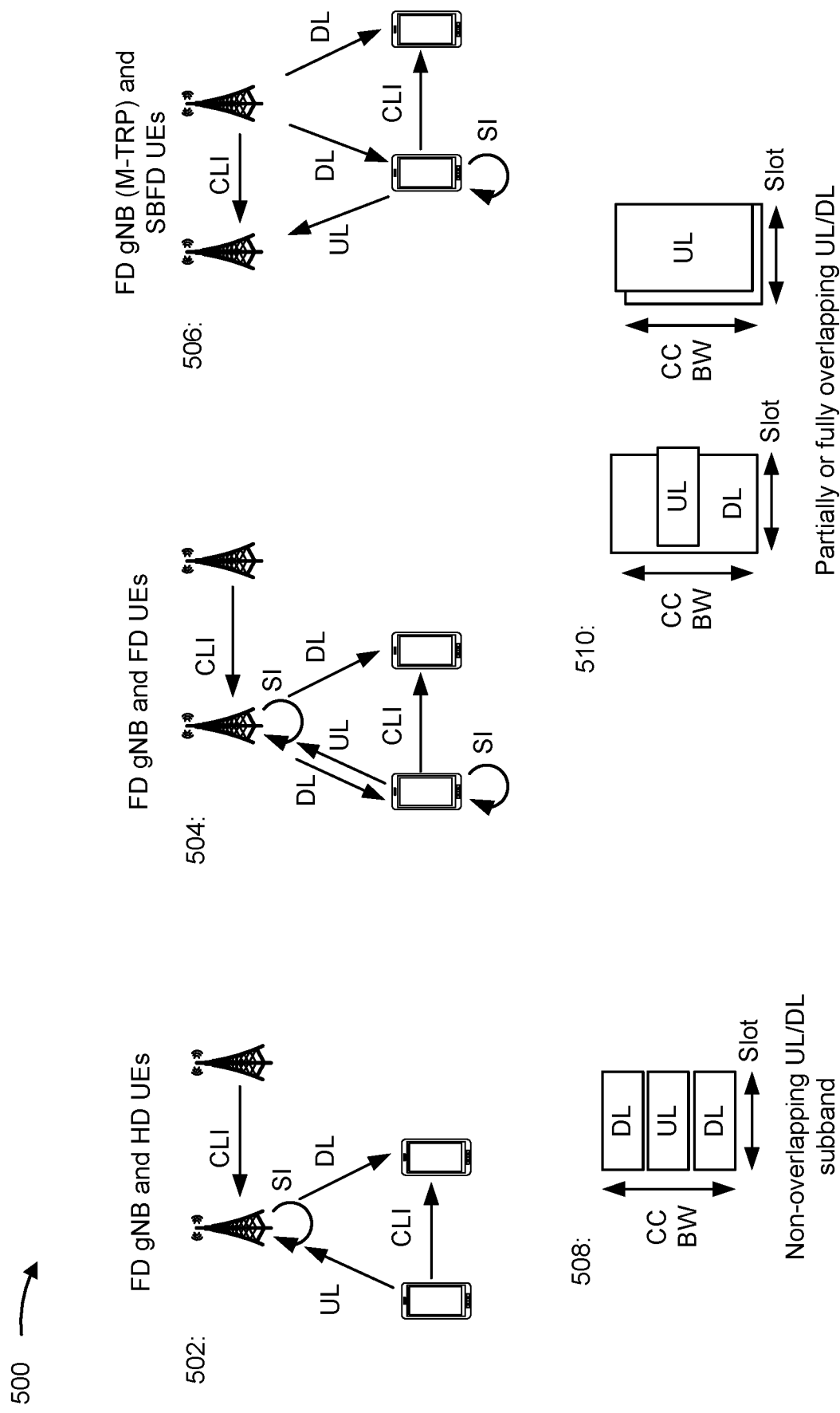
FIG. 5 is a diagram illustrating examples of FD communications, in accordance with the present disclosure.

FIG. 5 is a diagram illustrating examples 500 of FD communications, in accordance with the present disclosure.

As shown by reference number 502, an FD network node may communicate with half duplex (HD) UEs. The FD network node may be subjected to cross-link interference (CLI) from another FD network node (e.g., inter-network node CLI). The FD network node may experience self-interference (SI). The FD network node may receive an uplink transmission from a first HD UE, and the FD network node may transmit a downlink transmission to a second HD UE. The second HD UE may be subjected to CLI from the first HD UE (e.g., inter-UE CLI).

As shown by reference number 504, an FD network node may communicate with FD UEs. The FD network node may be subjected to CLI from another FD network node. The FD network node may experience SI. The FD network node may transmit a downlink transmission to a first FD UE, and the FD network node may receive an uplink transmission from the first FD UE at the same time as the downlink transmission. The FD network node may transmit a downlink transmission to a second FD UE. The second HD UE may be subjected to CLI from the first HD UE. The first UE may experience SI.

As shown by reference number 506, a first FD network node, which may be associated with multiple transmission reception points (TRPs), may communicate with SBFD UEs. The first FD network node may be subjected to CLI from a second FD network node. The first FD network node may receive an uplink transmission from a first SBFD UE. The second FD network node may transmit downlink transmissions to both the first SBFD UE and a second SBFD UE. The second SBFD UE may be subjected to CLI from the first SBFD UE. The first SBFD UE may experience SI.

As shown by reference number 508, an SBFD slot may be associated with a non-overlapping uplink/downlink subband. Within a component carrier bandwidth, an uplink resource may be in between, in a frequency domain, a first downlink resource and a second downlink resource. The first downlink resource, the second downlink resource, and the uplink resource may all be associated with the same time.

As shown by reference number 510, a slot may be associated with partially or fully overlapping uplink/downlink resources. Within a component carrier bandwidth, an uplink resource may fully or partially overlap with a downlink resource.

As indicated above, FIG. 5 is provided as an example. Other examples may differ from what is described with regard to FIG. 5.

A UE complexity may be reduced to save power at the UE and network usage by the UE. The UE complexity may be reduced based at least in part on a UE bandwidth reduction to 5 MHz in FR1. The UE bandwidth reduction may be in combination with a relaxed UE processing timeline for a physical downlink shared channel (PDSCH), a physical uplink shared channel (PUSCH), and/or channel state information (CSI). The UE complexity may be reduced based at least in part on a reduced UE peak data rate in FR1. The reduced UE peak data rate may be associated with a restricted bandwidth for a PDSCH and/or PUSCH, and may be in combination with the relaxed UE processing timeline for the PDSCH, the PUSCH, and/or the CSI.

A RedCap UE and a non-RedCap UE may coexist in the same cell. A RedCap UE may support a lower MCS as compared to a non-RedCap UE. A RedCap UE may support a lower maximum transmit power as compared to a non-RedCap UE. A RedCap UE may have a less advanced beamforming capability as compared to a non-RedCap UE. A RedCap UE may have less hardware (e.g., fewer antennas) as compared to a non-RedCap UE.

Figure 6:
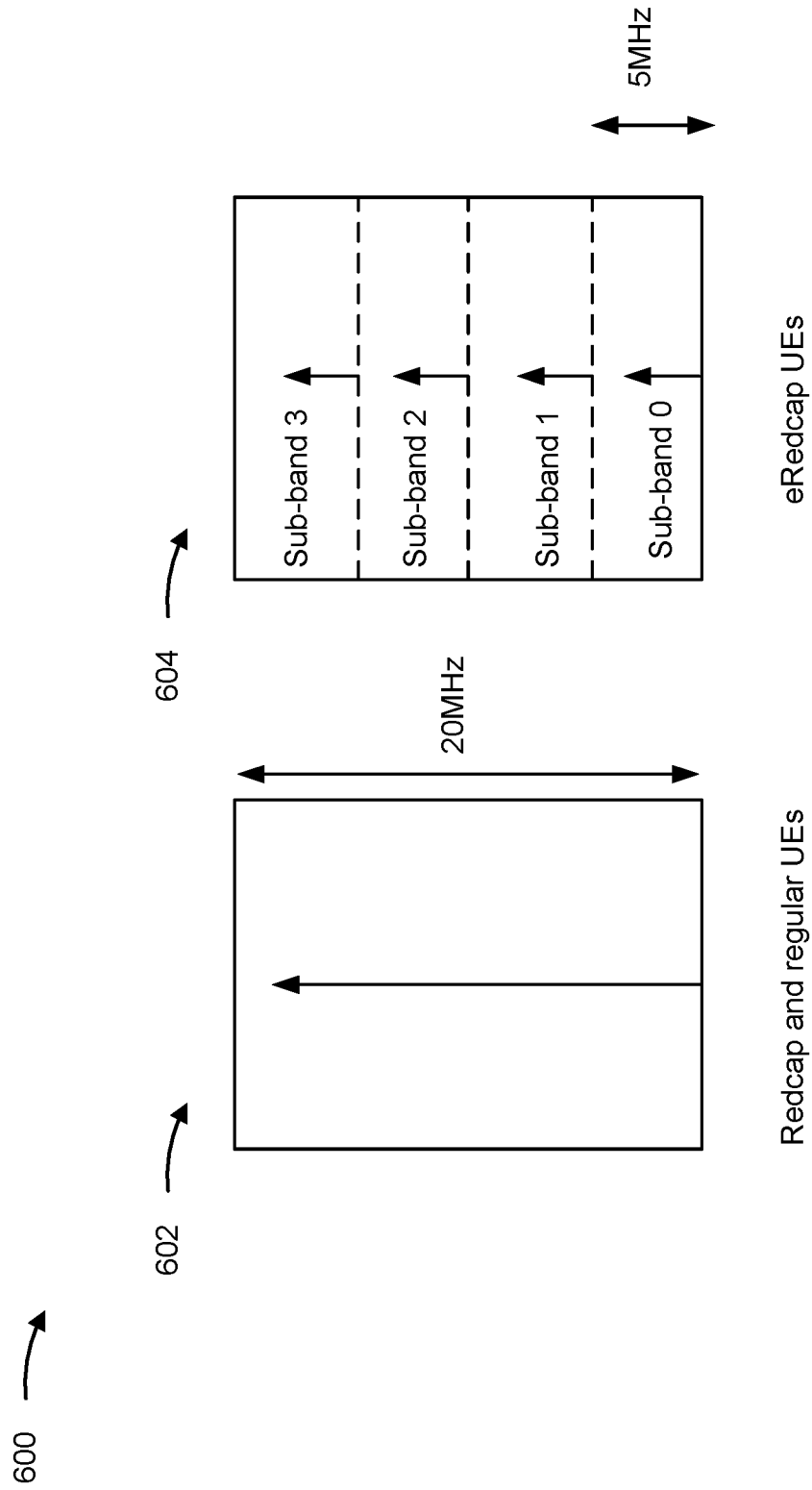
FIG. 6 is a diagram illustrating examples of frequency domain resources, in accordance with the present disclosure.

FIG. 6 is a diagram illustrating examples of frequency domain resources, in accordance with the present disclosure.

As shown by reference number 602, a frequency domain resource may be used by RedCap UEs and non-RedCap UEs. For example, a BWP (e.g., spanning a bandwidth of 20 MHz) may be used by RedCap UEs and non-RedCap UEs.

As shown by reference number 604, a frequency domain resource may be used by eRedCap UEs. The frequency domain resource may be partitioned into smaller sub-bands based at least in part on a frequency domain resource restriction. For example, a BWP (e.g., spanning a bandwidth of 20 MHz) may be partitioned into four sub-bands, with each sub-band being associated with a bandwidth of 5 MHz, and the different sub-bands may be used by the eRedCap UEs. At a given time, an individual eRedCap UE may only be operating in a given sub-band. As, a result, at a given time, an individual eRedCap UE may only be operating on 5 MHz, which may reduce an energy consumption at the eRedCap UE. An eRedCap UE may be configured to operate on a BWP partition (e.g., a sub-band of 5 MHz), whereas a RedCap UE may only be able to operate on a whole BWP (e.g., 20 MHz).

Legacy UEs (e.g., RedCap UEs and non-RedCap UEs) may coexist with eRedCap UEs in the same BWP. A downlink BWP (e.g., a configured legacy downlink BWP) may be partitioned into sub-bands. A sub-band start may be determined with respect to a physical resource block (PRB) 0 of the downlink BWP, and may be based at least in part on a subcarrier spacing (SCS) of the downlink BWP. An offset may be determined based at least in part on a maximum UE bandwidth. For example, offset k is represented by $k*N_{rb}$, where $N_{rb}$ is a quantity of resource blocks associated with the maximum UE bandwidth. A sub-band may be valid when the sub-band is associated with a predefined quantity of resource blocks (e.g., $N_{rb}$). A start of a frequency domain resource allocation (FDRA) for a downlink reception may be the first resource block in a valid sub-band.

As indicated above, FIG. 6 is provided as an example. Other examples may differ from what is described with regard to FIG. 6.

In an FD network, a slot (e.g., an SBFD slot) may be used for SBFD transmission. In other words, the slot may be used for both downlink and uplink transmissions. The slot may be shared between non-RedCap UEs (e.g., normal UEs), Red-Cap UEs, and eRedCap UEs. The slot may be partitioned into sub-bands, and the sub-bands may be used by the eRedCap UEs. However, for the eRedCap UEs, some of the sub-bands may not be available for downlink reception. Some of the sub-bands may correspond to an uplink resource, and thus may not be available for downlink reception. The eRedCap UEs may not be aware of which sub-bands are available for downlink reception and which sub-bands are not available for downlink reception. In a downlink slot, as opposed to an SBFD slot, all sub-bands of the downlink slot may be available for downlink reception, so the UE does not have the problem of not being aware of which sub-bands are available or not available for downlink reception.

The network node may indicate, to the UE, individual resources that are not available as rate matching resources or resources that are not available for downlink reception. However, in some cases, an entire sub-band may not be available for downlink reception, and indicating individual resources may involve transmitting an inordinate quantity of bits.

In various aspects of techniques and apparatuses described herein, a UE (e.g., an eRedCap UE) may receive, from a network node, an eRedCap downlink and uplink BWP configuration associated with an SBFD slot. The eRedCap downlink and uplink BWP configuration may include a bit to indicate an availability of a sub-band in the SBFD slot. The availability of the sub-band in the SBFD slot may be for a downlink reception or an uplink transmission. The eRedCap downlink and uplink BWP configuration may indicate which sub-bands are not available for downlink reception or uplink transmission. The UE may perform, with the network node, a communication based at least in part on the eRedCap downlink and uplink BWP configuration. As a result, in a full-duplex network in which some slots are used for SBFD transmissions, certain sub-bands of the slots used for SBFD transmissions which are not available to eRedCap UEs may be indicated to the eRedCap UEs, which may improve an overall performance of the eRedCap UEs.

Figure 7:
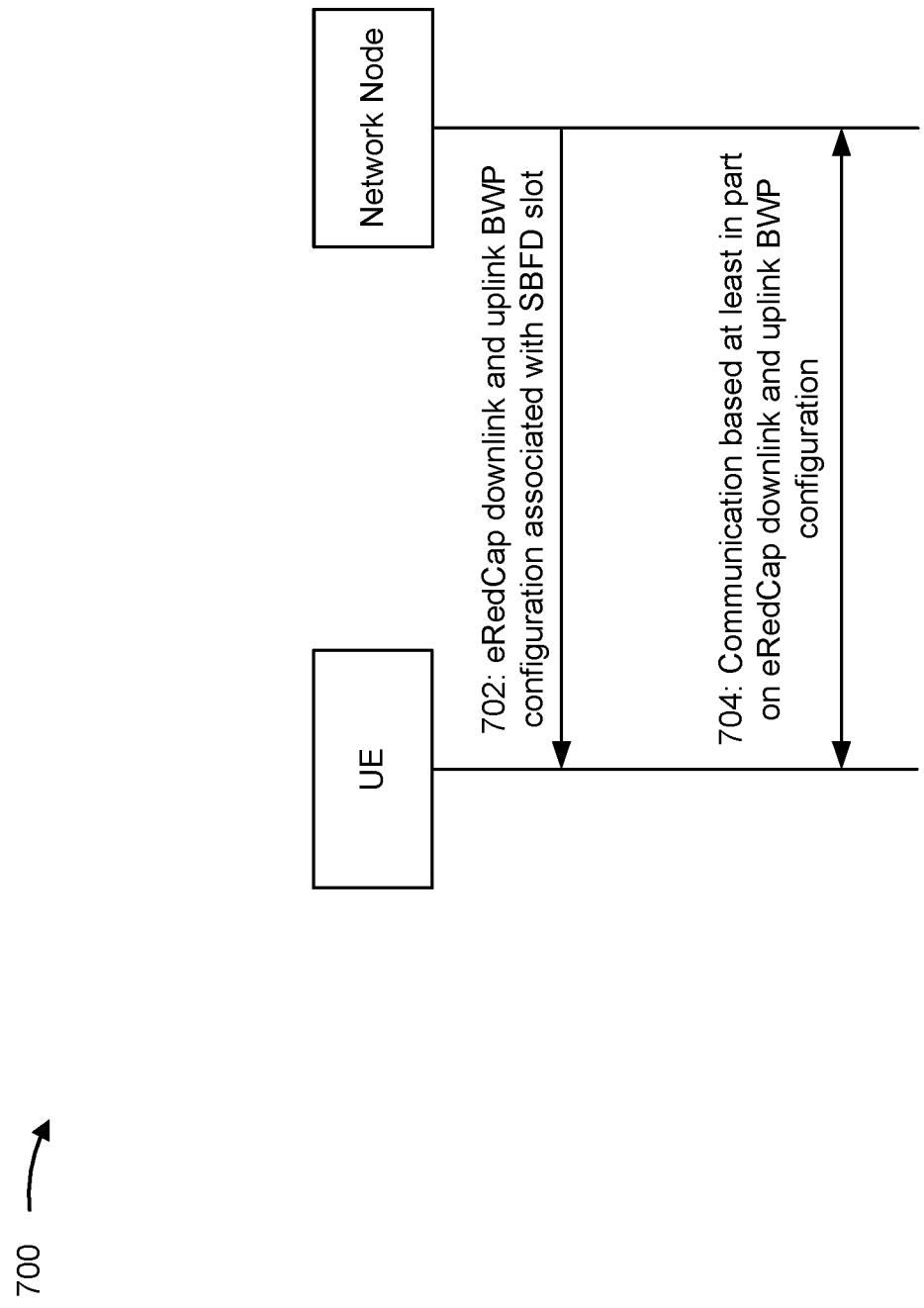
FIGS. 7-11 are diagrams illustrating examples associated with an availability of sub-slots in a sub-band full duplex (SBFD) slot, in accordance with the present disclosure.

FIG. 7 is a diagram illustrating an example 700 associated with an availability of sub-slots in an SBFD slot, in accordance with the present disclosure. As shown in FIG. 7, example 700 includes communication between a UE (e.g., UE 120) and a network node (e.g., network node 110). In some aspects, the UE and the network node may be included in a wireless network, such as wireless network 100. The UE may be an eRedCap UE.

As shown by reference number 702, the UE may receive, from the network node, an eRedCap downlink and uplink BWP configuration associated with an SBFD slot. The eRedCap downlink and uplink BWP configuration may include a bitmap that indicates a bit for each sub-band, of a plurality of sub-bands, associated with the SBFD slot. The bit may indicate an availability of the sub-band in the SBFD slot. The bit may explicitly indicate the availability of the sub-band in the SBFD slot based at least in part on the UE not being indicated with an SBFD frequency domain slot format associated with the SBFD slot. The availability of the sub-band in the SBFD slot may be for a downlink reception. The availability of the sub-band in the SBFD slot may be for an uplink transmission. In some aspects, the UE may be configured with resources that are unavailable for downlink reception or uplink transmission, and the resources may overlap with the sub-band that is available in the SBFD slot.

In some aspects, the SBFD slot may include a downlink sub-band and an uplink sub-band. The downlink sub-band may at least partially overlap with the uplink sub-band and may be considered unavailable for the downlink reception, or the uplink sub-band may at least partially overlap with the downlink sub-band and may be considered unavailable for the uplink reception. In some aspects, the SBFD slot may include the downlink sub-band and the uplink sub-band, wherein a sub-band size of the downlink sub-band that at least partially overlaps with the uplink sub-band may be adjusted to fit within the downlink sub-band. The sub-band size may be adjusted based at least in part on a minimum sub-band size configuration. In some aspects, the sub-band may be formed starting from an initial PRB and an offset. The offset may be adapted so that the sub-band includes available resources for the downlink reception and does not include unavailable resources for the downlink reception. A start of a frequency domain resource allocation overlaps with the available resources.

As shown by reference number 704, the UE may perform, with the network node, a communication based at least in part on the eRedCap downlink and uplink BWP configuration. The UE may perform the communication using the sub-band that is available in the SBFD slot, as indicated by the bit in the eRedCap downlink and uplink BWP configuration, where the bit may be associated with the sub-band. The UE may not perform communications using sub-bands that are not available in the SBFD slot, as indicated by corresponding bits in the eRedCap downlink and uplink BWP configuration.

As indicated above, FIG. 7 is provided as an example. Other examples may differ from what is described with regard to FIG. 7.

In some aspects, in an eRedCap downlink/uplink BWP configuration, each sub-band may be configured with one bit that indicates an availability of the sub-band in an SBFD slot. The one bit may provide a sub-band availability indication. A sub-band availability in a legacy HD slot may or may not be impacted by the sub-band availability indication. The eRedCap downlink/uplink BWP configuration may be associated with an SBFD slot structure, and the eRedCap downlink/uplink BWP configuration may change when the SBFD slot structure changes. In some aspects, an overlap with resources that are not available for downlink reception or uplink transmission may occur. When a UE (e.g., an eRedCap UE) is configured with certain resources that are not available for downlink reception or uplink transmission, the UE may consider these unavailable resources that only overlap with available sub-bands.

Figure 8:
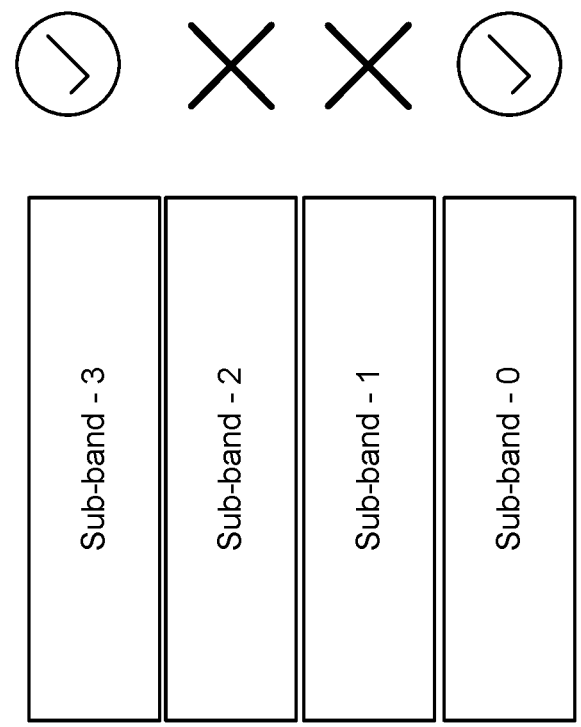

FIG. 8 is a diagram illustrating an example 800 associated with an availability of sub-slots in an SBFD slot, in accordance with the present disclosure.

As shown in FIG. 8, a bitmap may include a first bit that indicates whether a first sub-band is available (e.g., sub-band 0 is available), a second bit that indicates whether a second sub-band is available (e.g., sub-band 1 is not available), a third bit that indicates whether a third sub-band is available (e.g., sub-band 2 is not available), or a fourth bit that indicates whether a fourth sub-band is available (e.g., sub-band 3 is available). In other words, each bit in the bitmap may indicate whether a corresponding sub-band is available or not available in an SBFD slot. The bitmap may provide an explicit indication to the UE in case the UE is not aware of an SBFD frequency domain slot format, which may be reasonable when the UE is an eRedCap UE.

As indicated above, FIG. 8 is provided as an example. Other examples may differ from what is described with regard to FIG. 8.

In some aspects, a UE may be configured with an SBFD frequency domain slot format, even when the UE is an eRedCap UE. When the SBFD frequency domain slot format is known to the UE, the UE may be provided with an implicit indication of available sub-bands within an SBFD slot, as opposed to an explicit indication (e.g., a bitmap that includes one bit for each sub-band to indicate an availability of the sub-band). The implicit indication may be for the UE that is aware of the SBFD frequency domain slot format. In some aspects, downlink sub-bands in the SBFD slot that overlap even partially with an uplink sub-band may be considered to be unavailable for downlink reception. Similarly, uplink sub-bands in the SBFD slot that overlap even partially with a downlink sub-band may be considered to be unavailable for uplink reception. In some aspects, for a downlink sub-band that partially overlaps with an uplink sub-band, the UE may adapt a sub-band size to fit within the downlink sub-band. A minimum sub-band size may be configured, which may be used to determine whether a sub-band is entirely not considered available or whether the UE is able to adapt the size of the sub-band.

Figure 9:
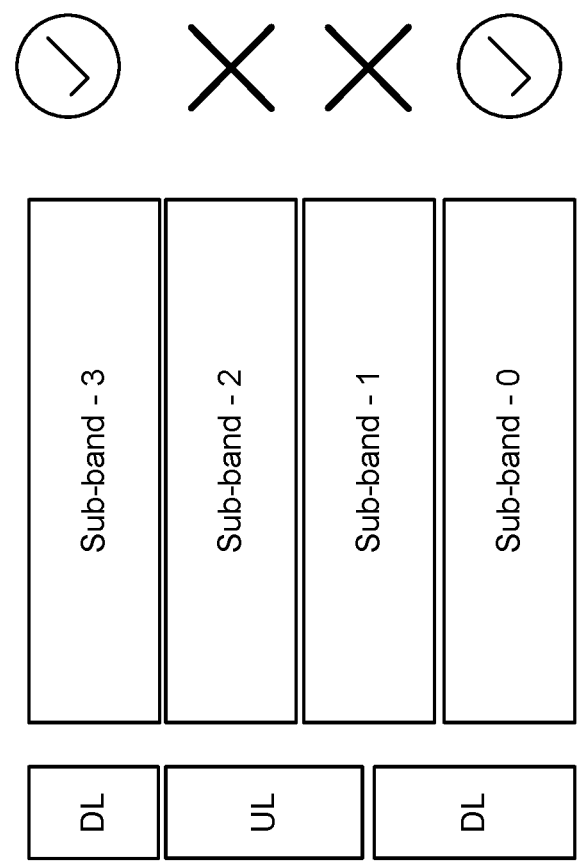

FIG. 9 is a diagram illustrating an example 900 associated with an availability of sub-slots in an SBFD slot, in accordance with the present disclosure.

As shown in FIG. 9, an SBFD slot may include a first sub-band (sub-band 0), a second sub-band (sub-band 1), a third sub-band (sub-band 2), and a fourth sub-band (sub-band 3). The first sub-band may be a downlink sub-band. The fourth sub-band may be a downlink sub-band. The second sub-band may include both a downlink sub-band and an uplink sub-band. In other words, the second sub-band may overlap partially with an uplink sub-band. The third sub-band may include an uplink sub-band. As a result, the second sub-band and the third sub-band may be unavailable for downlink reception.

As indicated above, FIG. 9 is provided as an example. Other examples may differ from what is described with regard to FIG. 9.

Figure 10:
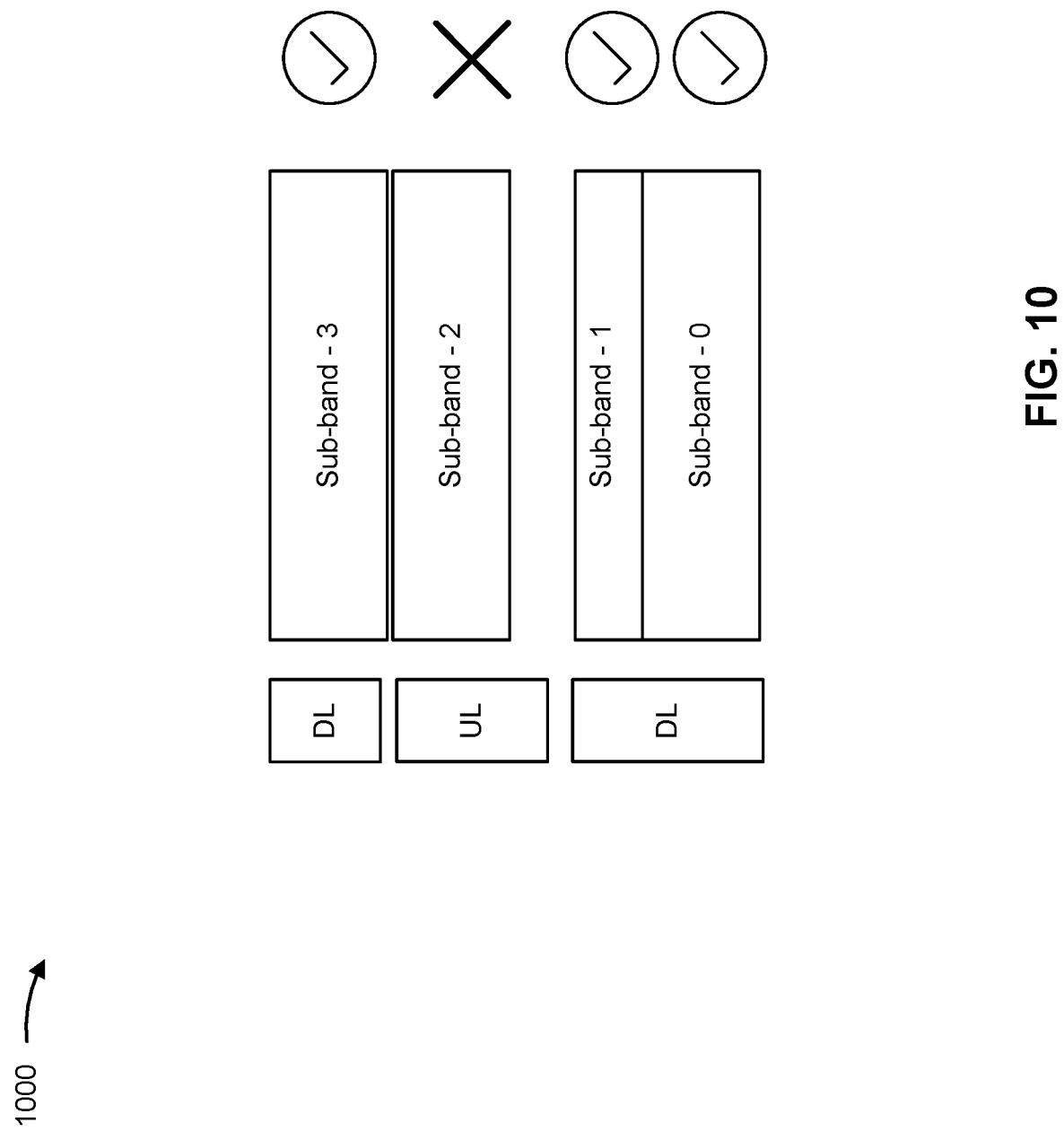

FIG. 10 is a diagram illustrating an example 1000 associated with an availability of sub-slots in an SBFD slot, in accordance with the present disclosure.

As shown in FIG. 10, an SBFD slot may include a first sub-band (sub-band 0), a second sub-band (sub-band 1), a third sub-band (sub-band 2), and a fourth sub-band (sub-band 3). The first sub-band may be a downlink sub-band. The fourth sub-band may be a downlink sub-band. The third sub-band may include an uplink sub-band, which may cause the third sub-band to be unavailable for downlink reception. The second sub-band, which would otherwise partially overlap with the uplink sub-band and not be available, may be modified such that a sub-band size associated with the second sub-band is adapted to fit within the downlink sub-band. The sub-band size associated with the second sub-band may be decreased, such that the second sub-band is within the downlink sub-band and does not overlap with the uplink sub-band. As a result, the second sub-band may be a downlink sub-band.

As indicated above, FIG. 10 is provided as an example. Other examples may differ from what is described with regard to FIG. 10.

In some aspects, a UE may form sub-bands to be available from a beginning, as opposed to forming sub-bands and then determining (e.g., via an explicit indication) which sub-bands are available or not available. In other words, sub-bands that are available or not available for downlink reception or uplink transmission may be considered during a sub-band formation. A sub-band (e.g., an eRedCap UE sub-band) may be formed starting from PRB 0 of a legacy UE and an offset. The offset may be adapted, such that the sub-band includes only available resources for downlink reception. Each sub-band may be associated with a different offset, such that the sub-band is only associated with resources that are available for downlink reception (e.g., not uplink resources). Further, a start of an FDRA may overlap (e.g., should overlap) with available resources.

Figure 11:
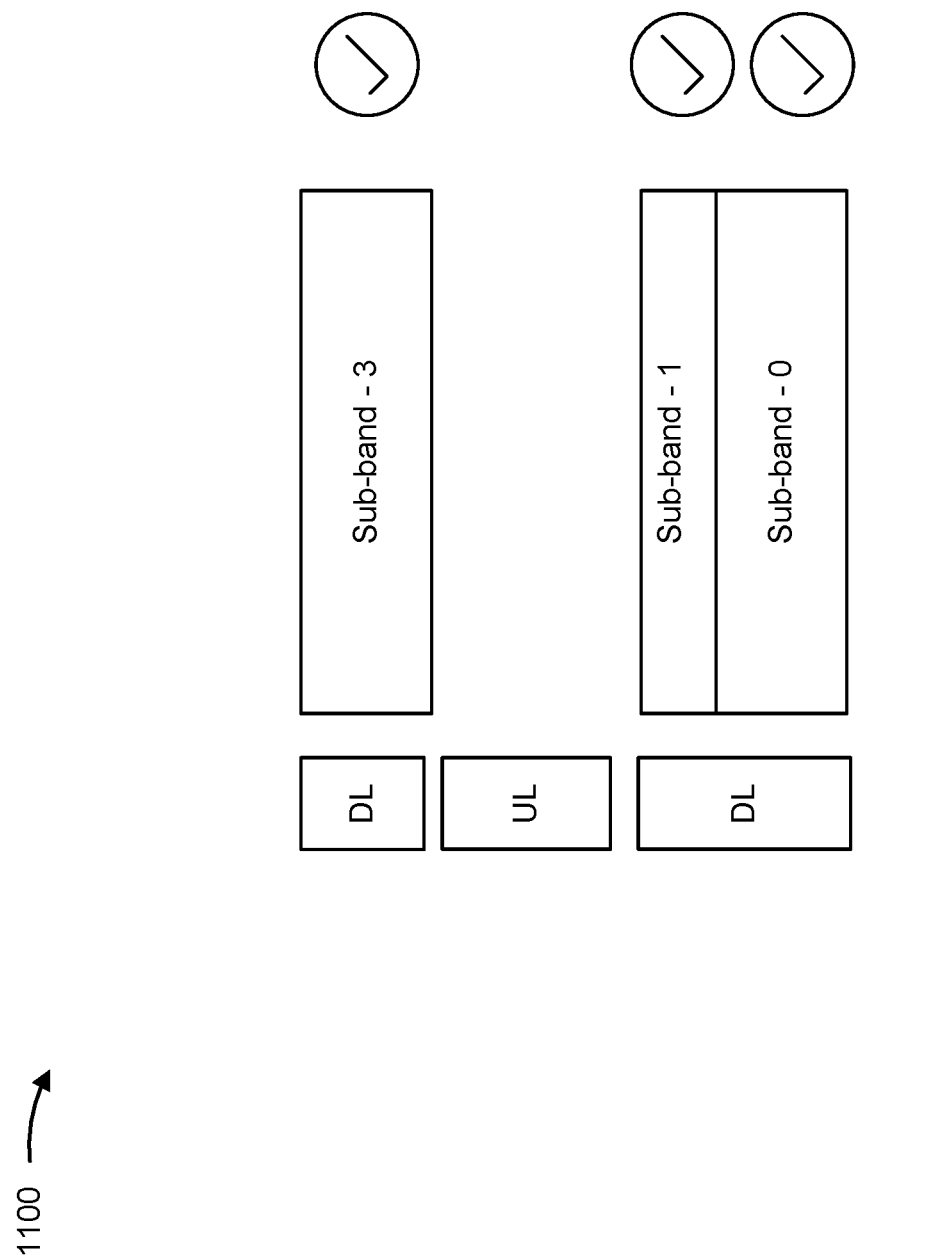

FIG. 11 is a diagram illustrating an example 1100 associated with an availability of sub-slots in an SBFD slot, in accordance with the present disclosure.

As shown in FIG. 11, during an available sub-band formation, a UE may form sub-bands based at least in part on sub-bands that are available. For example, the UE may determine a first sub-band (e.g., sub-band 0) that is associated with available resources for downlink reception. The UE may determine a second sub-band (e.g., sub-band 1) that is associated with available resources for downlink reception. The UE may detect resources (e.g., uplink resources) that are not available for downlink reception, and the UE may not form a sub-band using such resources. The UE may determine a third sub-band (e.g., sub-band 2) that is associated with available resources for downlink reception. As a result, the UE may take available resources for downlink reception into account during the sub-band formation.

As indicated above, FIG. 11 is provided as an example. Other examples may differ from what is described with regard to FIG. 11.

Figure 12:
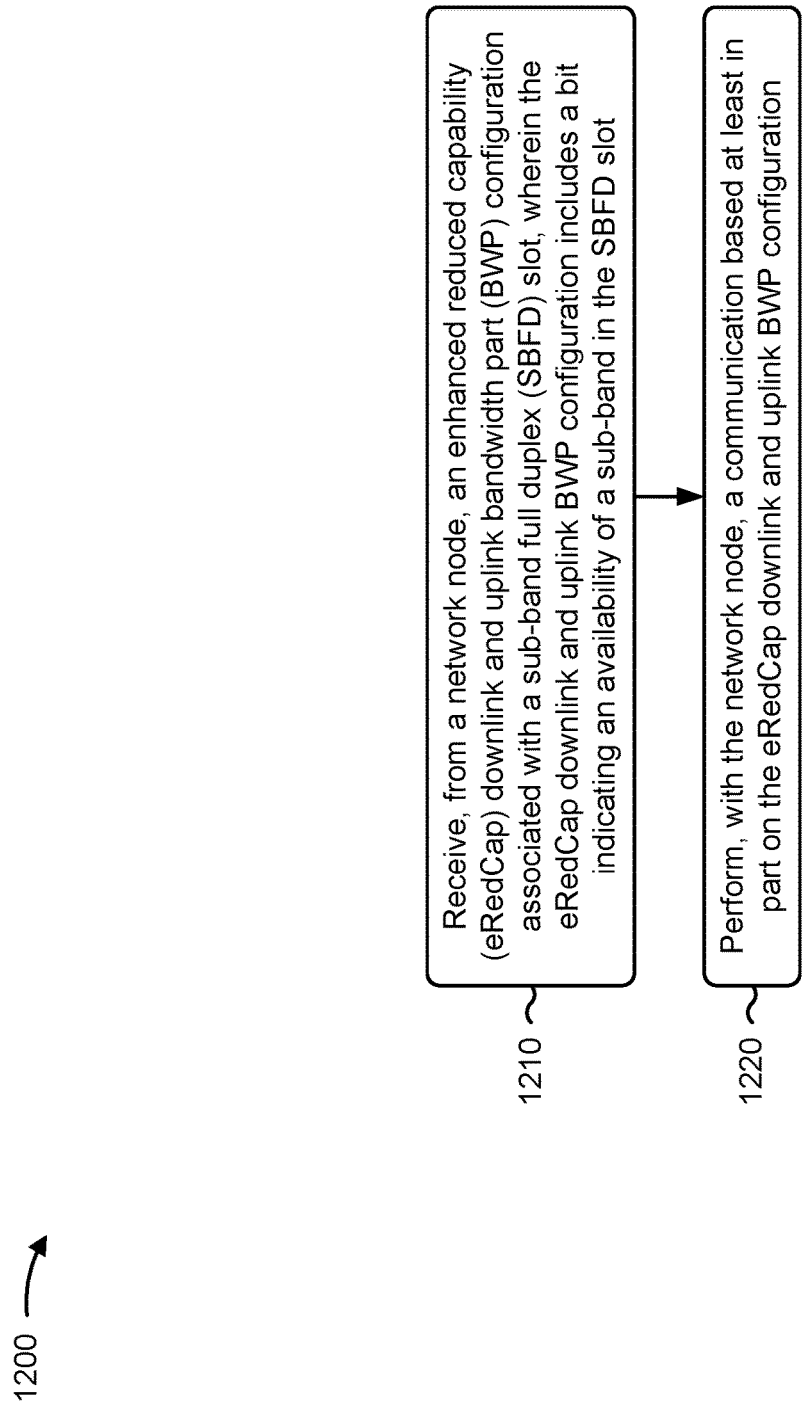
FIGS. 12-13 are diagrams illustrating example processes associated with an availability of sub-slots in an SBFD slot, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with indicating an availability of sub-slots in an SBFD slot.

As shown in FIG. 12, in some aspects, process 1200 may include receiving, from a network node, an eRedCap downlink and uplink BWP configuration associated with an SBFD slot, wherein the eRedCap downlink and uplink BWP configuration includes a bit indicating an availability of a sub-band in the SBFD slot (block 1210). For example, the UE (e.g., using reception component 1402, depicted in FIG. 14) may receive, from a network node, an eRedCap downlink and uplink BWP configuration associated with an SBFD slot, wherein the eRedCap downlink and uplink BWP configuration includes a bit indicating an availability of a sub-band in the SBFD slot, as described above.

As further shown in FIG. 12, in some aspects, process 1200 may include performing, with the network node, a communication based at least in part on the eRedCap downlink and uplink BWP configuration (block 1220). For example, the UE (e.g., using reception component 1402 and/or transmission component 1404, depicted in FIG. 14) may perform, with the network node, a communication based at least in part on the eRedCap downlink and uplink BWP configuration, as described above.

Process 1200 may include additional aspects, such as any single aspect or any combination of aspects described below and/or in connection with one or more other processes described elsewhere herein.

In a first aspect, the eRedCap downlink and uplink BWP configuration includes a bitmap that indicates a bit for each sub-band, of a plurality of sub-bands, associated with the SBFD slot.

In a second aspect, alone or in combination with the first aspect, the availability of the sub-band in the SBFD slot is for a downlink reception.

In a third aspect, alone or in combination with one or more of the first and second aspects, the availability of the sub-band in the SBFD slot is for an uplink transmission.

In a fourth aspect, alone or in combination with one or more of the first through third aspects, the UE is configured with resources that are unavailable for downlink reception or uplink transmission, and the resources overlap with the sub-band that is available in the SBFD slot.

In a fifth aspect, alone or in combination with one or more of the first through fourth aspects, the bit explicitly indicates the availability of the sub-band in the SBFD slot based at least in part on the UE not being indicated with an SBFD frequency domain slot format associated with the SBFD slot.

In a sixth aspect, alone or in combination with one or more of the first through fifth aspects, the SBFD slot includes a downlink sub-band and an uplink sub-band, and the downlink sub-band at least partially overlaps with the uplink sub-band and is considered unavailable for a downlink reception, or the uplink sub-band at least partially overlaps with the downlink sub-band and is considered unavailable for an uplink reception.

In a seventh aspect, alone or in combination with one or more of the first through sixth aspects, the SBFD slot includes a downlink sub-band and an uplink sub-band, wherein a sub-band size of the downlink sub-band that at least partially overlaps with the uplink sub-band is adjusted to fit within the downlink sub-band, and the sub-band size is adjusted based at least in part on a minimum sub-band size configuration.

In an eighth aspect, alone or in combination with one or more of the first through seventh aspects, the sub-band is formed starting from an initial PRB and an offset, wherein the offset is adapted so that the sub-band includes available resources for a downlink reception and does not include unavailable resources for the downlink reception, and a start of an FDRA overlaps with the available resources.

In a ninth aspect, alone or in combination with one or more of the first through eighth aspects, the UE is an eRedCap UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
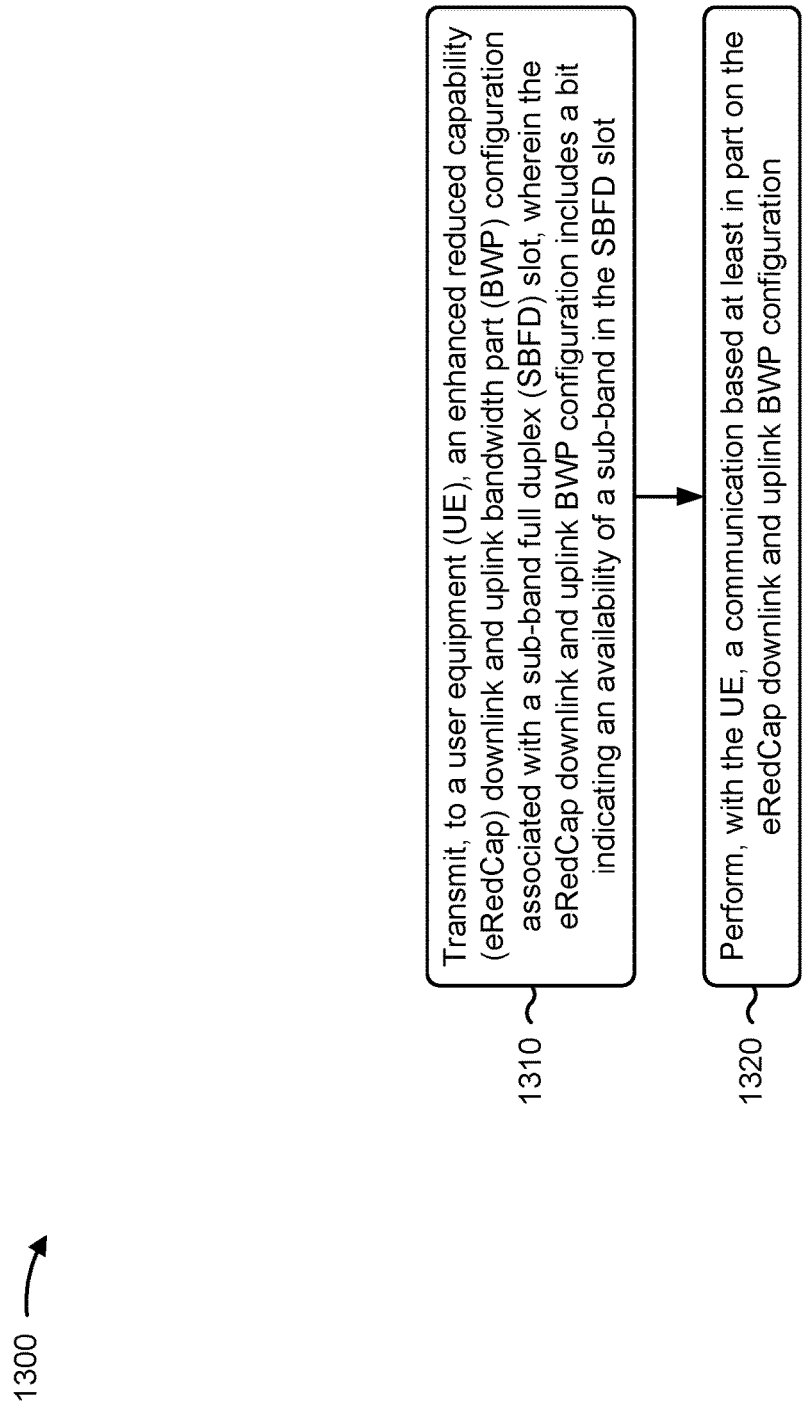

FIG. 13 is a diagram illustrating an example process 1300 performed, for example, by a network node, in accordance with the present disclosure. Example process 1300 is an example where the network node (e.g., network node 110) performs operations associated with indicating an availability of sub-slots in an SBFD slot.

As shown in FIG. 13, in some aspects, process 1300 may include transmitting, to a UE, an eRedCap downlink and uplink BWP configuration associated with an SBFD slot, wherein the eRedCap downlink and uplink BWP configuration includes a bit indicating an availability of a sub-band in the SBFD slot (block 1310). For example, the network node (e.g., using transmission component 1504, depicted in FIG. 15) may transmit, to a UE, an eRedCap downlink and uplink BWP configuration associated with an SBFD slot, wherein the eRedCap downlink and uplink BWP configuration includes a bit indicating an availability of a sub-band in the SBFD slot, as described above.

As further shown in FIG. 13, in some aspects, process 1300 may include performing, with the UE, a communication based at least in part on the eRedCap downlink and uplink BWP configuration (block 1320). For example, the network node (e.g., using reception component 1502 and/or transmission component 1504, depicted in FIG. 15) may perform, with the UE, a communication based at least in part on the eRedCap downlink and uplink BWP configuration, as described above.

Process 1300 may include additional aspects, such as any single aspect or any combination of aspects described below and/or in connection with one or more other processes described elsewhere herein.

In a first aspect, the UE is configured with resources that are unavailable for downlink reception or uplink transmission, and the resources overlap with the sub-band that is available in the SBFD slot.

In a second aspect, alone or in combination with the first aspect, the bit explicitly indicates the availability of the sub-band in the SBFD slot based at least in part on the UE not being indicated with an SBFD frequency domain slot format associated with the SBFD slot.

In a third aspect, alone or in combination with one or more of the first and second aspects, the SBFD slot includes a downlink sub-band and an uplink sub-band, and the downlink sub-band at least partially overlaps with the uplink sub-band and is considered unavailable for a downlink reception, or the uplink sub-band at least partially overlaps with the downlink sub-band and is considered unavailable for an uplink reception.

In a fourth aspect, alone or in combination with one or more of the first through third aspects, the SBFD slot includes a downlink sub-band and an uplink sub-band, wherein a sub-band size of the downlink sub-band that at least partially overlaps with the uplink sub-band is adjusted to fit within the downlink sub-band, and the sub-band size is adjusted based at least in part on a minimum sub-band size configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
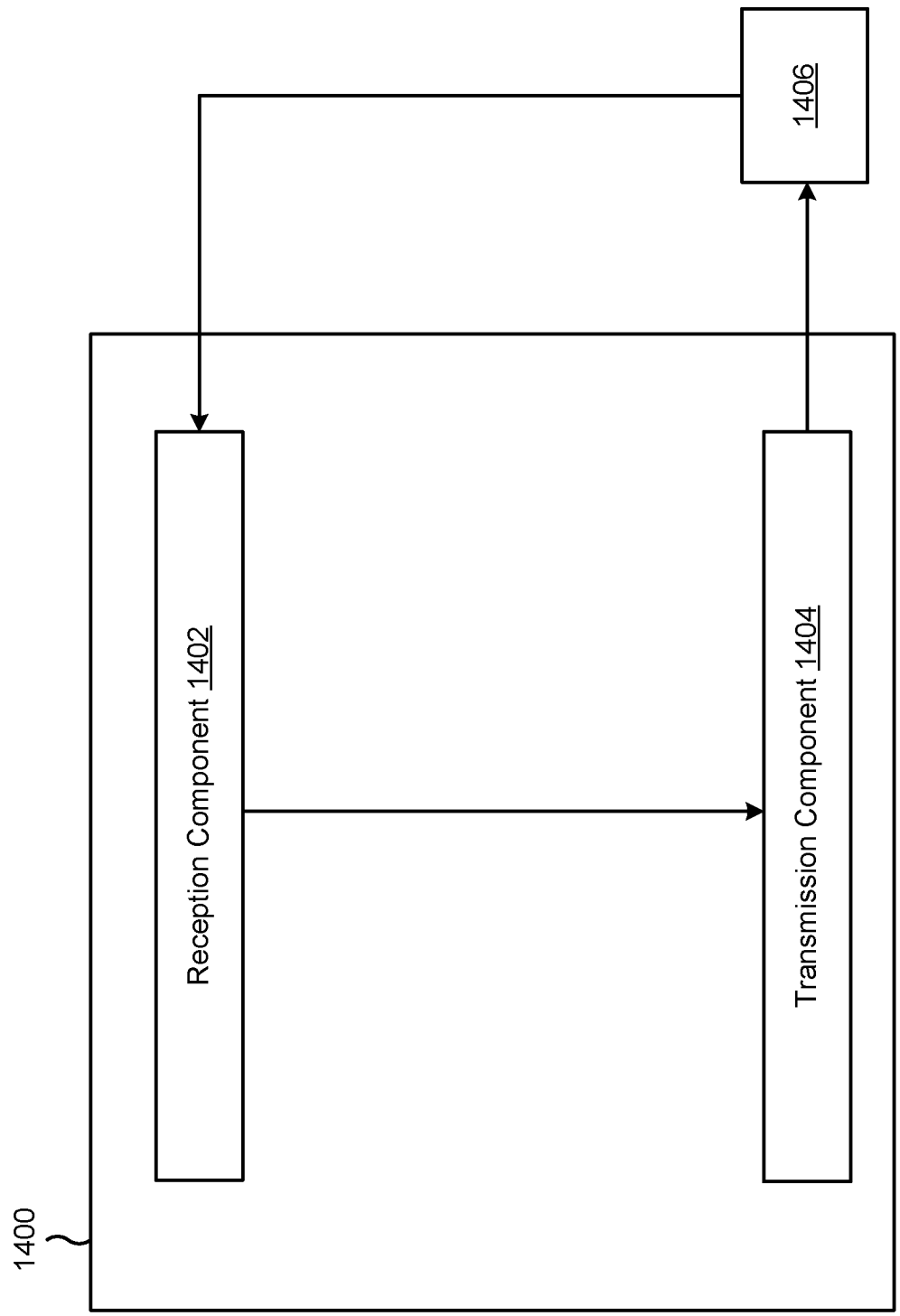
FIGS. 14-15 are diagrams of example apparatuses for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140.

In some aspects, the apparatus 1400 may be configured to perform one or more operations described herein in connection with FIGS. 7-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive, from a network node, an eRedCap downlink and uplink BWP configuration associated with an SBFD slot, wherein the eRedCap downlink and uplink BWP configuration includes a bit indicating an availability of a sub-band in the SBFD slot. The reception component 1402 and/or transmission component 1404 may perform, with the network node, a communication based at least in part on the eRedCap downlink and uplink BWP configuration.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
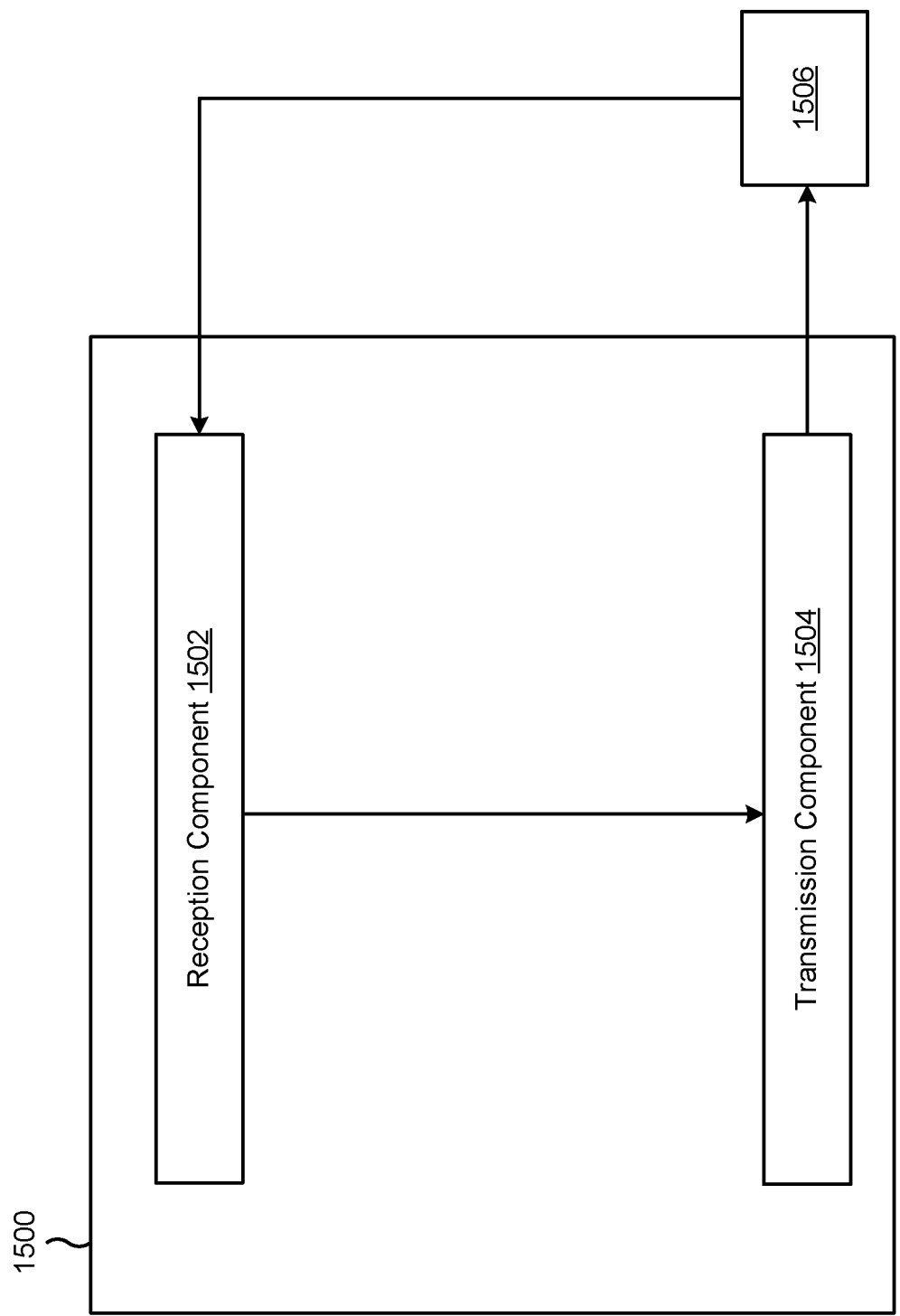

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504.

In some aspects, the apparatus 1500 may be configured to perform one or more operations described herein in connection with FIGS. 7-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The transmission component 1504 may transmit, to a UE, an eRedCap downlink and uplink BWP configuration associated with an SBFD slot, wherein the eRedCap downlink and uplink BWP configuration includes a bit indicating an availability of a sub-band in the SBFD slot. The reception component 1502 and/or transmission component 1504 may perform, with the UE, a communication based at least in part on the eRedCap downlink and uplink BWP configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and performing, with the network node, a communication based at least in part on the eRedCap downlink and uplink BWP configuration.

Aspect 2: The method of Aspect 1, wherein the eRedCap downlink and uplink BWP configuration includes a bitmap that indicates a bit for each sub-band, of a plurality of sub-bands, associated with the SBFD slot.

Aspect 3: The method of any of Aspects 1 through 2, wherein the availability of the sub-band in the SBFD slot is for a downlink reception.

Aspect 4: The method of any of Aspects 1 through 3, wherein the availability of the sub-band in the SBFD slot is for an uplink transmission.

Aspect 5: The method of any of Aspects 1 through 4, wherein the UE is configured with resources that are unavailable for downlink reception or uplink transmission, and wherein the resources overlap with the sub-band that is available in the SBFD slot.

Aspect 6: The method of any of Aspects 1 through 5, wherein the bit explicitly indicates the availability of the sub-band in the SBFD slot based at least in part on the UE not being indicated with an SBFD frequency domain slot format associated with the SBFD slot.

Aspect 7: The method of any of Aspects 1 through 6, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

Aspect 8: The method of any of Aspects 1 through 7, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

Aspect 9: The method of any of Aspects 1 through 8, wherein the sub-band is formed starting from an initial physical resource block and an offset, wherein the offset is adapted so that the sub-band includes available resources for a downlink reception and does not include unavailable resources for the downlink reception, and wherein a start of a frequency domain resource allocation overlaps with the available resources.

Aspect 10: The method of any of Aspects 1 through 9, wherein the UE is an eRedCap UE.

Aspect 11: A method of wireless communication performed by a network node, comprising: transmitting, to a user equipment (UE), an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and performing, with the UE, a communication based at least in part on the eRedCap downlink and uplink BWP configuration.

Aspect 12: The method of Aspect 11, wherein the UE is configured with resources that are unavailable for downlink reception or uplink transmission, and wherein the resources overlap with the sub-band that is available in the SBFD slot.

Aspect 13: The method of any of Aspects 11 through 12, wherein the bit explicitly indicates the availability of the sub-band in the SBFD slot based at least in part on the UE not being indicated with an SBFD frequency domain slot format associated with the SBFD slot.

Aspect 14: The method of any of Aspects 11 through 13, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

Aspect 15: The method of any of Aspects 11 through 14, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and
perform, with the network node, a communication based at least in part on the eRedCap downlink and uplink BWP configuration.

2. The apparatus of claim 1, wherein the eRedCap downlink and uplink BWP configuration includes a bitmap that indicates a bit for each sub-band, of a plurality of sub-bands, associated with the SBFD slot.

3. The apparatus of claim 1, wherein the availability of the sub-band in the SBFD slot is for a downlink reception.

4. The apparatus of claim 1, wherein the availability of the sub-band in the SBFD slot is for an uplink transmission.

5. The apparatus of claim 1, wherein the UE is configured with resources that are unavailable for downlink reception or uplink transmission, and wherein the resources overlap with the sub-band that is available in the SBFD slot.

6. The apparatus of claim 1, wherein the bit explicitly indicates the availability of the sub-band in the SBFD slot based at least in part on the UE not being indicated with an SBFD frequency domain slot format associated with the SBFD slot.

7. The apparatus of claim 1, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

8. The apparatus of claim 1, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

9. The apparatus of claim 1, wherein the sub-band is formed starting from an initial physical resource block and an offset, wherein the offset is adapted so that the sub-band includes available resources for a downlink reception and does not include unavailable resources for the downlink reception, and wherein a start of a frequency domain resource allocation overlaps with the available resources.

10. The apparatus of claim 1, wherein the UE is an eRedCap UE.

11. An apparatus for wireless communication at a network node, comprising:
a memory; and
one or more processors, coupled to the memory, configured to:
transmit, to a user equipment (UE), an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and
perform, with the UE, a communication based at least in part on the eRedCap downlink and uplink BWP configuration.

12. The apparatus of claim 11, wherein the UE is configured with resources that are unavailable for downlink reception or uplink transmission, and wherein the resources overlap with the sub-band that is available in the SBFD slot.

13. The apparatus of claim 11, wherein the bit explicitly indicates the availability of the sub-band in the SBFD slot based at least in part on the UE not being indicated with an SBFD frequency domain slot format associated with the SBFD slot.

14. The apparatus of claim 11, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

15. The apparatus of claim 11, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

16. A method of wireless communication performed by a user equipment (UE), comprising:
receiving, from a network node, an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and
performing, with the network node, a communication based at least in part on the eRedCap downlink and uplink BWP configuration.

17. The method of claim 16, wherein the eRedCap downlink and uplink BWP configuration includes a bitmap that indicates a bit for each sub-band, of a plurality of sub-bands, associated with the SBFD slot.

18. The method of claim 16, wherein the availability of the sub-band in the SBFD slot is for a downlink reception.

19. The method of claim 16, wherein the availability of the sub-band in the SBFD slot is for an uplink transmission.

20. The method of claim 16, wherein the UE is configured with resources that are unavailable for downlink reception or uplink transmission, and wherein the resources overlap with the sub-band that is available in the SBFD slot.

21. The method of claim 16, wherein the bit explicitly indicates the availability of the sub-band in the SBFD slot based at least in part on the UE not being indicated with an SBFD frequency domain slot format associated with the SBFD slot.

22. The method of claim 16, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

23. The method of claim 16, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

24. The method of claim 16, wherein the sub-band is formed starting from an initial physical resource block and an offset, wherein the offset is adapted so that the sub-band includes available resources for a downlink reception and does not include unavailable resources for the downlink reception, and wherein a start of a frequency domain resource allocation overlaps with the available resources.

25. The method of claim 16, wherein the UE is an eRedCap UE.

26. A method of wireless communication performed by a network node, comprising:
transmitting, to a user equipment (UE), an enhanced reduced capability (eRedCap) downlink and uplink bandwidth part (BWP) configuration associated with a sub-band full duplex (SBFD) slot, wherein the eRedCap downlink and uplink BWP configuration includes a bit indicating an availability of a sub-band in the SBFD slot; and
performing, with the UE, a communication based at least in part on the eRedCap downlink and uplink BWP configuration.

27. The method of claim 26, wherein the UE is configured with resources that are unavailable for downlink reception or uplink transmission, and wherein the resources overlap with the sub-band that is available in the SBFD slot.

28. The method of claim 26, wherein the bit explicitly indicates the availability of the sub-band in the SBFD slot based at least in part on the UE not being indicated with an SBFD frequency domain slot format associated with the SBFD slot.

29. The method of claim 26, wherein the SBFD slot includes a downlink sub-band and an uplink sub-band, and wherein the downlink sub-band at least partially overlaps with the uplink sub-band and is considered unavailable for a downlink reception, or the uplink sub-band at least partially overlaps with the downlink sub-band and is considered unavailable for an uplink reception.

30. The method of claim 26, wherein the SBFD slot includes a downlink sub-band and an uplink sub-band, wherein a sub-band size of the downlink sub-band that at least partially overlaps with the uplink sub-band is adjusted to fit within the downlink sub-band, and wherein the sub-band size is adjusted based at least in part on a minimum sub-band size configuration.

\* \* \* \* \*